L. N. BOURDEAU.
GREASE CUP.
APPLICATION FILED AUG. 18, 1920.

1,393,879.

Patented Oct. 18, 1921.

INVENTOR
Leon N. Bourdeau,
BY Walter N. Haskell,
his ATTORNEY

UNITED STATES PATENT OFFICE.

LEON N. BOURDEAU, OF ROCK ISLAND, ILLINOIS.

GREASE-CUP.

1,393,879.  Specification of Letters Patent.  Patented Oct. 18, 1921.

Application filed August 18, 1920. Serial No. 404,481.

*To all whom it may concern:*

Be it known that I, LEON N. BOURDEAU, a citizen of the United States, residing at Rock Island, in the county of Rock Island and State of Illinois, have invented certain new and useful Improvements in Grease-Cups, of which the following is a specification.

My invention relates to grease cups, such as are used on connecting rods of locomotives, to contain lubricating material therefor. The removable parts of the grease-cups, or plugs, are liable to become unseated, and lost, by reason of the vibration of the parts upon which the grease-cup is mounted, and it has been found necessary to provide special securing means to prevent the casual escape of such parts. The purpose of the present invention is to provide means in the plug itself, which will make it self-retaining, and wherein the vibrations of the parts will tend, if anything, to introduce the plug more deeply into the grease-cup.

The central space within the cup beneath the plug is filled, when in use with a hard oil, of a semi-solid character, and my device is designed to make use of a portion of such oil, to form a bond between the plug and surrounding cup, to hold the plug from independent movement.

Figure 1:
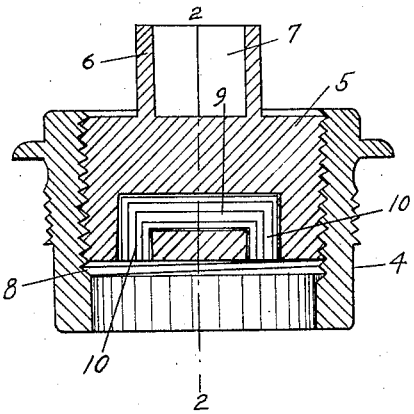
Figure 1 shows the invention in vertical medial section.
Figure 2:
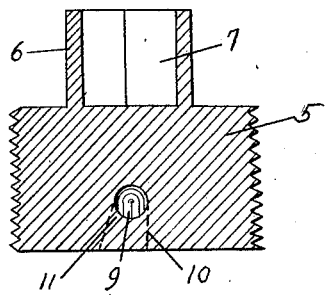
Fig. 2 is a cross-section of the plug, on the line 2—2 of Fig. 1.

4 represents a bushing of usual construction, adapted to be secured in the oil opening of a connecting rod, and 5 is the plug therefor, threaded to correspond with interior threads 8 in the bushing 4. The plug 5 is provided with a wrench extension 6, having a recess 7 which can also be engaged by a tool in turning the plug inwardly or outwardly. In the lower part of the plug is a channel 9, provided at its ends with openings 10 into the face of the plug.

When the oil cavity and grease-cup have been supplied with lubricant, and the plug 5 is turned into position in the cup, a portion of the oil will be forced through the openings 10 into the channel 9, such oil possessing sufficient solidity to form a bond uniting the plug with the bushing 4, and the parts in which it is seated, preventing independent movement of the plug, except by the application of considerable force thereto. The cup is at first well filled with the lubricant, and upon the parts becoming heated there is a tendency of the grease to expand, exerting an outward force against the plug. As the grease feeds inwardly, however, there is a shrinkage of the grease, and the tendency is in the opposite direction, operating to draw the threads of the plug against the inner faces of the threads of the bushing. This tendency, coupled with the vibration of the connecting rod mechanism, will tend to work the plug inwardly. This inward movement is limited by the extent of the thread 8, which is not cut through the entire length of the bore of the bushing, as will appear in Fig. 1 of the drawings.

Figure 3:
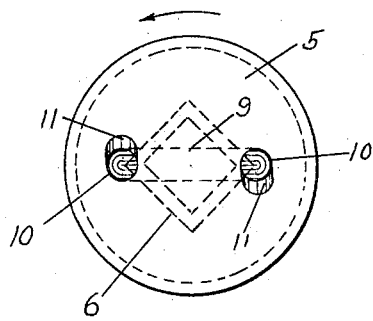
Fig. 3 is a lower plan view of the plug.

The openings 10 are preferably provided with inclined faces 11, on the opposite sides of such openings from the direction of the movement of the plug, when it is being turned inwardly. This will cause such openings to fill with the grease, upon a reverse movement of the plug, and resist such movement. On the other hand, there will be less resistance when the plug is turned inwardly, in the direction shown by the arrow in Fig. 3.

There has been shown in the drawings and set forth herein the preferred embodiment of my invention, it being obvious that changes can be made therein without departing from the spirit and scope of the invention.

What I claim and desire to secure, is:

1. In a device of the class described, the combination of a bushing adapted to be mounted on the connecting rod of a locomotive; a plug rotatably adjustable in said bushing, and provided near its inner end with an internal transverse channel; and openings connecting the ends of said channel with the inner face of said plug.

2. In a device of the class described, a bushing adapted for mounting on the connecting rod of a locomotive; a plug rotatably adjustable in said bushing, and provided near its inner end with an internal transverse channel; and openings connecting the ends of said channel with the inner face of said plug, and provided with inclined faces on the sides of the openings opposite to the direction of movement of the plug, when being seated.

In testimony whereof I affix my signature.

LEON N. BOURDEAU.